United States Patent [19]

Niki et al.

[11] 3,955,011
[45] May 4, 1976

[54] METHOD OF MANUFACTURING FISH MEAT POWDER CAPABLE OF MAKING THE KAMABOKO

[75] Inventors: Hiroshi Niki; Toru Doi, both of Sapporo; Seiichiro Igarashi, Tokorozawa; Toshiro Kanauchi, Komae, all of Japan

[73] Assignee: Snow Brand Milk Products Co. Ltd., Sapporo, Japan

[22] Filed: Feb. 6, 1975

[21] Appl. No.: 547,652

[52] U.S. Cl............................ 426/643; 426/574; 426/471
[51] Int. Cl.². ........................................... A22C 25/00
[58] Field of Search .......... 426/573, 574, 643, 471, 426/331, 456

[56] References Cited
UNITED STATES PATENTS

| | | | |
|---|---|---|---|
| 2,851,356 | 9/1958 | Bedford | 426/643 X |
| 3,408,210 | 10/1968 | Heyman | 426/643 X |
| 3,529,975 | 9/1970 | Gray | 426/643 |

*Primary Examiner*—Raymond N. Jones
*Assistant Examiner*—R. A. Yoncoskie
*Attorney, Agent, or Firm*—Lane, Aitken, Dunner & Ziems

[57] ABSTRACT

This invention relates to a method of manufacturing fish meat powder which, on being blended with suitable amounts of water and table salt, exhibits the same degree of ability to make KAMABOKO as fresh fish meat and which is capable of retaining the ability to make KAMABOKO for a long period of time.

6 Claims, 3 Drawing Figures

METHOD OF MANUFACTURING FISH MEAT POWDER CAPABLE OF MAKING THE KAMABOKO

BACKGROUND OF THE INVENTION

Many previous attempts have been made to produce a fish meat powder which, when it is blended with water and table salt and heated, produces KAMABOKO having a jelly strength equal to that prepared from fresh fish meat. Because of the susceptibility of fish protein to denaturation, however, no satisfactory practical method has yet been developed for the manufacture of the fish meat powder of the aforementioned description. Processes suggested by the prior art includes a method whereby fish meat is freeze-dried and, in that state, powdered (Journal of Japan Fishery Association, Vol. 37, p. 130 (1971)) and a method whereby fish is converted into a slurry and spray-dried into a form of powder (Report of Fishery Experiment Stations, Vol. 12, p. 55 (1942)). The former method excessively expensive due to the system required for drying, although it is successful in preventing the denaturation of fish protein. The latter method, on the other hand, which involves spray-drying the fish meat, is infeasible because the fish meat slurry has high viscosity and additionally, because the fish protein is susceptible to denaturation by heat.

BRIEF SUMMARY OF THE INVENTION

It has now been discovered that divalent metal ions such as calcium and magnesium are highly effective in lowering the high viscosity of a fish meat slurry which otherwise poses a serious problem in spray-drying the fish meat slurry and further, that thermal denaturation of the slurry during the spray-drying can be prevented by adjusting the pH value of the slurry to a value near neutrality.

The present invention has as its object, to provide a method of manufacturing fish meat powder capable of retaining the same degree of ability to make KAMABOKO as fresh fish meat, which method includes spray-drying a fish meat slurry.

This invention is characterized by the steps of finely grinding a fresh fish meat or frozen fish meat slurry in the presence of a divalent metal ion, adjusting the pH value of the resultant fish meat slurry to a value in the neighborhood of neutrality and thereafter, spray-drying the fish meat slurry.

BRIEF EXPLANATION OF THE DRAWING

With reference to the accompanying drawings.

DETAILED DESCRIPTION OF THE INVENTION

Figure 1:
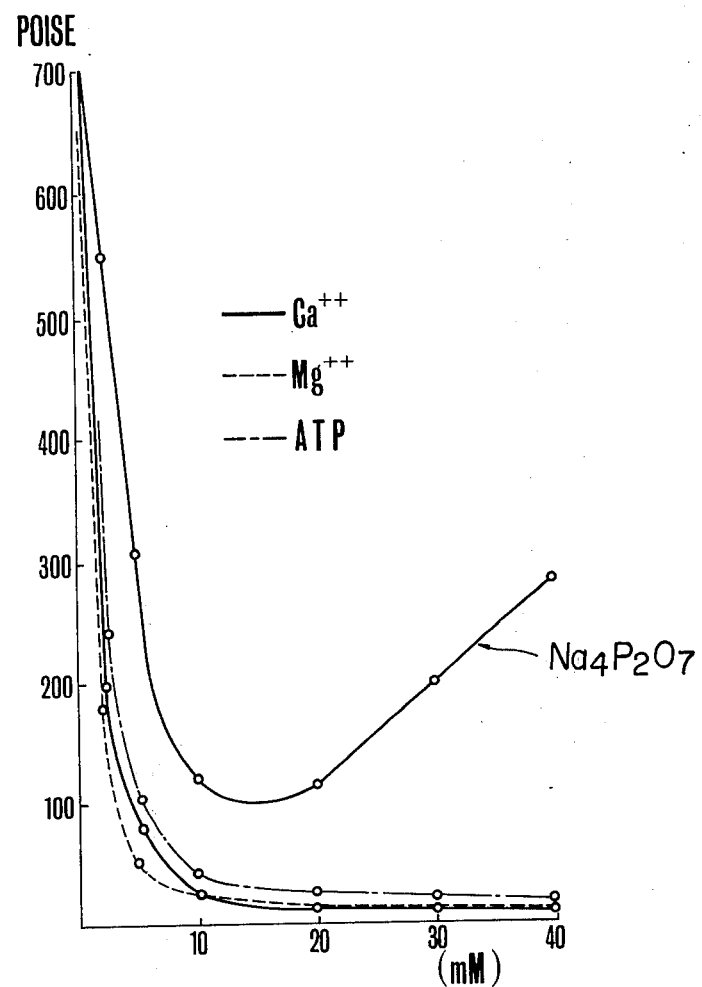
FIG. 1 is a graphic representation of the effects of calcium and magnesium ions in lowering of the viscosity of a fish meat slurry.

The term "ability to make KAMABOKO" as used in the present specification refers to the property by which fish meat powder, when blended with suitable amounts of water and table salt and then heated at about 90°C for 30 minutes, exhibits the same jelly strength as is exhibited when fresh fish meat is similarly blended and heated.

Any of a wide variety of fish can be used as the raw material for the present invention, so long as it is in a fresh state. Therefore, fish which has remained in a frozen state since immediately after the time of its catch is also usable. Also SURIMI prepared from a mixture of fresh fish meat, polyphosphate, sorbitol and sugar, and preserved in a frozen state is likewise usable as the raw material for the purpose of the present invention. A commercially available frozen SURIMI contains polyphosphate, sorbitol and sugar for preventing the denaturation of fish meat proteins.

According to this invention, fresh fish meat or frozen SURIMI is converted into a slurry with the addition thereto of a divalent metal ion, such as calcium ion or magnesium ion, in the form of a water-soluble salt. The amount in which such divalent metal ion is used is preferably not more than 10 mM based on the water content of the slurry. It should be noted that the divalent metal, if used at a higher concentration, will have an adverse effect on the taste of the KAMABOKO. Where fresh fish meat is used as the raw material, for example, the preparation of fish meat slurry is accomplished by collecting the meat portions alone of the fish, bleaching the collected fish meat several times with water, draining the bleached fish meat, then passing the meat through a strainer, mixing the strained meat with water to a volume to give a solids content in the range of from 7 to 10%, adding a divalent metal ion and finely mincing the resultant mixture by means of a colloid mill. Where frozen SURIMI of fish meat is used as the raw material, the preparation is effected by finely chopping the frozen block by use of a cutter, mixing the finely divided particles with water in the same manner as described above, combining the aqueous meat mixture with a divalent metal ion and finely mincing the mixture by use of a colloid mill. Particularly when fresh fish meat is used as the raw material, for the purpose of further reducing the chance of denaturation of fish protein due to heat, it is desirable that a polyphosphate (such as, for example, sodium pyrophosphate) be added in an amount of 2 to 10 mM based on the water content of fish meat and sorbitol, glucose or sucrose be added in an amount of 5 to 10% by weight based on the weight of the fish meat and blended with the meat in advance.

As the next step, the fish meat slurry prepared as described above is adjusted to a pH value in the neighborhood of neutrality, preferably in the range of from 7.0 to 7.3. For the purpose of adjusting the pH value, a sugar solution of calcium hydroxide or an aqueous solution of an alkali salt such as sodium hydrogen carbonate is preferably used.

Since the slurry prepared as described above has a relatively low viscosity, the conversion of the slurry into a powder can easily be accomplished by filtering the slurry and then spray-drying the filtered slurry.

Figure 2:
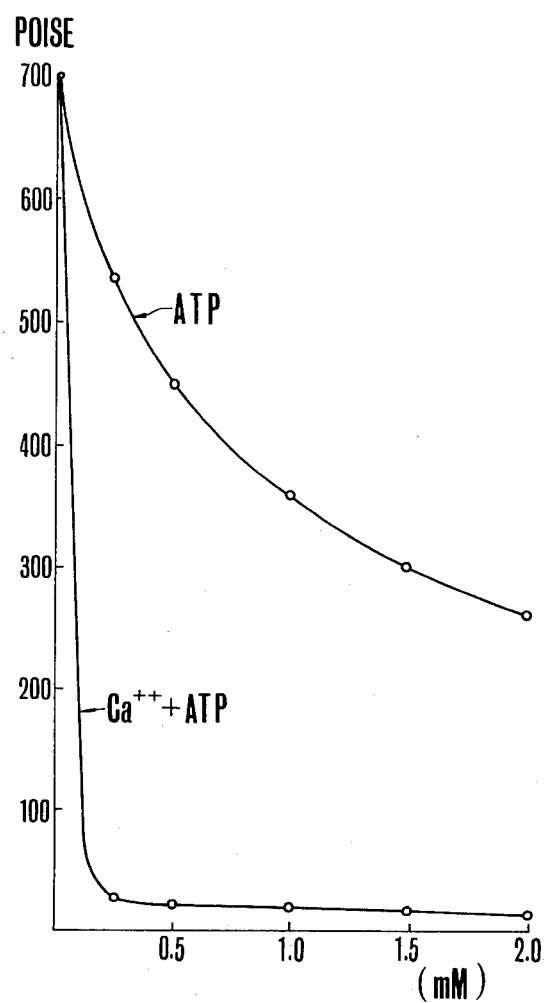
FIG. 2 is a graphic representation of the effects of calcium or magnesium ions used in conjunction with adenosine triphosphate in lowering the viscosity of fish meat slurry.

The effect upon the viscosity of the fish meat slurry of the divalent metal ion can be seen by reference to FIG. 1 of the accompanying drawings. FIG. 1 is a graphic representation of the change in viscosity of the fish meat slurry prepared by incorporating $Ca^{++}$ and $Mg^{++}$. It is seen from this graph that when $Ca^{++}$ and $Mg^{++}$ were each used at a concentration of 10 mM, the viscosity of fish meat slurry was lowered from the original value of 700 poise to about 30 poise. In FIG. 1, changes of viscosity produced by the addition of adenosine triphosphate (abbreviated as ATP) and sodium pyrophosphate are also plotted for the purpose of reference. The curves indicate that ATP used at a concentration of 10 mM was almost as effective in lowering the viscosity as $Ca^{++}$ and $Mg^{++}$, whereas sodium pyrophosphate was inferior in viscosity-reducing effect to $Ca^{++}$ and $Mg^{++}$. FIG. 2 graphically shows the changes in viscosity obtained by use of $Ca^{++}$ or $Mg^{++}$ in conjunction with ATP. It can be seen from the curves that, in the presence of a suitable concentration (10 mM) of $Ca^{++}$ or $Mg^{++}$, ATP could, even at a low concentration of not more than 0.5 mM, significantly lower the viscosity of the fish meat slurry. Thus, the present invention includes combined use of the divalent metal ion with a minute amount of ATP.

Figure 3:
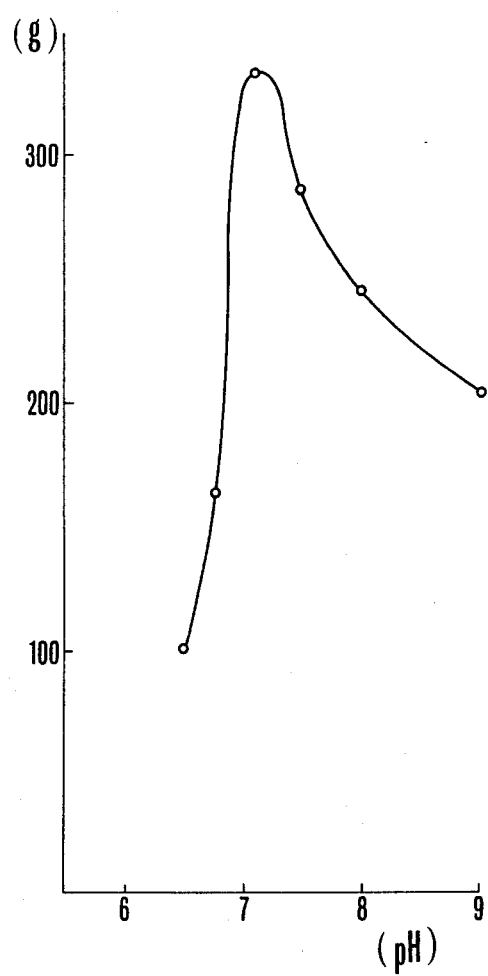
FIG. 3 is a graphic representation of the relationship between the pH value of the fish meat slurry prepared in accordance with the method of this invention and the ability to make KAMABOKO (jelly strength) possessed by the fish meat powder obtained from the fish meat slurry by spray-drying.

The relation between the pH value of the fish meat slurry prepared in accordance with the present invention and the jelly strength retained by the KAMABOKO prepared from the fish meat powder of the present invention is shown in FIG. 3. FIG. 3 is a graphic representation of the results of an experiment in which aliquots of fish meat prepared according to the present invention were adjusted to varying pH values between 6 and 9 and each fish meat was subsequently converted into fish meat powder and processed to produce KAMABOKO, which was tested for jelly strength. It is seen from the graph that the fish meat powder obtained from the fish meat slurry having a pH value in the range of 7.0 to 7.3, retained the highest jelly strength. In the experiment, the jelly strength was measured by use of an Okada type jelly strength gauge.

When fish meat slurry is prepared and then adjusted to a pH value in the neighborhood of neutrality, particularly in the range of from 7.0 to 7.3, there is obtained a fish meat slurry which has a low viscosity of not more than 30 poise and which is stable against heat applied in the course of spray-drying. The fish meat slurry thus obtained can, therefore, be easily spray-dried by an ordinary method to produce a fish meat powder which is capable of making a KAMABOKO possessing higher jelly strength than that obtainable directly from a raw fish meat powder. Thus, the present invention makes it possible to provide, on a commercial scale, a fish meat powder retaining the freshness of fish meat.

The fish meat powder obtained in accordance with the present invention was stored at normal room temperature and tested at various time intervals for change in its capacity for retaining the KAMABOKO making property. The results were as shown in the following table.

| Number of days of preservation | Jelly strength (g) of KAMABOKO produced from fish meat powder |
|---|---|
| 1 | 330 |
| 10 | 330 |
| 20 | 335 |
| 40 | 325 |
| 80 | 320 |
| 120 | 330 |

Specifically, the test mentioned above was carried out by grinding in a kneaded form a mixture of 1 kg of fish meat powder (water content of 6%) preserved in a tightly sealed condition, 3700 ml of water and 28 g of sodium pyrophosphate, subsequently subjecting the ground mixture to further grinding in the presence of 128 g of table salt and to finishing grinding with 329 g of starch, filling casings with the resultant kneaded fish meat, heating the filled casings at 90°C for 30 minutes and testing the KAMABOKO thus produced for jelly strength by use of an Okada type jelly strength gauge. It is seen from the foregoing table that the fish meat powder obtained in accordance with the present invention retains the KAMABOKO making property over a long period of storage.

As described above, the present invention has made it possible to manufacture fish meat powder capable of retaining freshness (the KAMABOKO making property) by using, as the raw material, fresh fish meat or frozen SURIMI, converting the raw material into a slurry in the presence of calcium or magnesium ions, then simply adjusting the pH to a value in the aforementioned range and spray-drying the slurry.

Now, the present invention will be described more specifically by reference to a preferred embodiment. It should be understood, however, that this invention is not limited in any way to this example.

EXAMPLE

This example illustrates an embodiment of the invention wherein fish meat powder was prepared by using, as the raw material, a commercially available frozen SURIMI, finely chopping the SURIMI in the presence of 10 mM of $Ca^{++}$ added thereto to thereby obtain a fish meat slurry having a lowered viscosity, then adjusting the fish meat slurry to a solids content of 8% and spray-drying the resultant fish meat slurry.

By use of a chopper 50 kg of frozen pollack meat SURIMI having a solids content of 20% and a pH of 7.3 (containing 0.1% of sodium pyrophosphate, 0.1% of sodium polyphosphate, 1.9% of sorbitol and 4.7% of sucrose respectively by weight) was finely chopped. A solution having 170 g of calcium chloride dihydrate dissolved in 75 kg of water was added to the finely chopped SURIMI and uniformly mixed. The resultant mixed liquid consisting of the SURIMI and calcium ion was converted into a slurry by use of a colloid mill. The slurry and 700 ml of aqueous 0.25 M sodium hydrogen carbonate solution (obtained through the steps of thermal deaeration and cooling) added thereto were homogeneously mixed again by use of a colloid mill to adjust the pH of the slurry to 7.1. This slurry was found to have a viscosity of 30 poise. The fish meat slurry thus prepared was filtered and thereafter, spray-dried to produce fish meat powder. One (1) kg of the fish meat powder (having 6% water content) was mixed with 3700 ml of water and 28 g of sodium pyrophosphate. The mixture was kneaded and the kneaded mixture was ground in the presence of 2.7% by weight of table salt and then subjected to finishing grinding in the presence of 7% by weight of starch added thereto. Casings were filled with the resulting ground mixture and heated at 90°C for 30 minutes to produce a KAMABOKO. The KAMABOKO thus obtained was tested for jelly strength by an Okada type jelly strength gauge. The strength was 330 g.

The KAMABOKO was separately produced directly from the same frozen Pollack meat SURIMI by an ordinary method for the purpose of comparison. It was found to have a jelly strength of 275 g.

What is claimed is:

1. A method for manufacturing a fish meat powder which retains the ability to form a kamaboko over an extended period of time, said kamaboko having a jelly strength approximately that produced from fresh fish meat, said method comprising:
   forming an aqueous slurry of fresh undenatured fish meat or one prepared from frozen SURIMI;
   adding a salt of an alkaline earth metal ion to said slurry in an amount sufficient to reduce the viscosity to a value suitable for spray-drying without causing denaturation;
   adjusting the pH of said slurry to approximately neutrality; and
   spray-drying said slurry to form the fish meat powder.

2. The method of claim 1 wherein said salt is a water-soluble salt of calcium or magnesium.

3. The method of claim 1 wherein said salt is used at a concentration of not more than 10 mM of metal ion, based on the water content of the slurry.

4. The method of claim 1 wherein said pH is adjusted to a value within the range of from 7.0 to 7.3.

5. The method of claim 4 wherein the pH adjustment is accomplished by the addition of a sugar solution of calcium oxide or an aqueous solution of sodium hydrogen carbonate.

6. The method of claim 1 wherein the fish meat powder is capable of retaining an ability to form kamaboko of a jelly strength of not less than 300 grams over a period of at least 120 days of storage.

* * * * *

UNITED STATES PATENT OFFICE
CERTIFICATE OF CORRECTION

Patent No. 3,955,011            Dated May 4, 1976

Inventor(s) Hiroshi Niki; Toru Doi; Seiichiro Igarashi and Toshiro Kanauchi

It is certified that error appears in the above-identified patent and that said Letters Patent are hereby corrected as shown below:

Column 3, line 2, "Ca--" should read --Ca++--;

line 3, "Mg--" should read --Mg++--; "Ca--" should read --Ca++--;

line 4, "Mg--" should read --Mg++--;

line 12, "Ca--" should read --Ca++--; "Mg--" should read --Mg++--;

line 14, "Ca--" should read --Ca++--; "Mg--" should read --Mg++--;

line 15, delete "Ca--" should read --Ca++--; "Mg--" should read --Mg++--;

line 18, "Ca--" should read --Ca++--; "Mg--" should read --Mg++--.

Column 4, line 34, "Ca--" should read --Ca++--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*